United States Patent
Whitehouse (10) Patent No.: US 9,678,879 B2
(45) Date of Patent: Jun. 13, 2017

(54) SET PARTITIONING FOR ENCODING FILE SYSTEM ALLOCATION METADATA

(75) Inventor: Steven Whitehouse, Swansea (GB)

(73) Assignee: Red Hat, Inc., Raleigh, NC (US)

( * ) Notice: Subject to any disclaimer, the term of this patent is extended or adjusted under 35 U.S.C. 154(b) by 1438 days.

(21) Appl. No.: 12/129,505

(22) Filed: May 29, 2008

(65) Prior Publication Data
US 2009/0300084 A1 Dec. 3, 2009

(51) Int. Cl.
*G06F 17/30* (2006.01)
*G06F 12/0866* (2016.01)

(52) U.S. Cl.
CPC .... *G06F 12/0866* (2013.01); *G06F 17/30132* (2013.01); *G06F 17/30091* (2013.01); *G06F 2212/466* (2013.01)

(58) Field of Classification Search
CPC ................................................ G06F 17/30091
USPC ........................................................ 707/694
See application file for complete search history.

(56) References Cited

U.S. PATENT DOCUMENTS

| | | | | |
|---|---|---|---|---|
| 5,175,852 | A | * | 12/1992 | Johnson et al. ...... 707/E17.007 |
| 5,239,644 | A | * | 8/1993 | Seki et al. ....................... 710/52 |
| 5,666,532 | A | * | 9/1997 | Saks et al. ..................... 707/613 |
| 5,764,807 | A | | 6/1998 | Pearlman et al. |
| 5,875,444 | A | * | 2/1999 | Hughes .................... 707/E17.01 |
| 5,897,661 | A | * | 4/1999 | Baranovsky et al. ........ 711/170 |
| 5,930,828 | A | * | 7/1999 | Jensen et al. .................. 711/170 |
| 5,933,603 | A | * | 8/1999 | Vahalia et al. ................. 709/225 |
| 5,959,560 | A | | 9/1999 | Said et al. |
| 5,991,862 | A | * | 11/1999 | Ruane ........................... 711/202 |
| 6,023,706 | A | * | 2/2000 | Schmuck et al. ........ 707/E17.01 |
| 6,122,646 | A | * | 9/2000 | Igarashi ................ G06F 3/0613 711/200 |
| 6,654,772 | B1 | * | 11/2003 | Crow et al. ............. 707/E17.01 |
| 6,674,911 | B1 | | 1/2004 | Pearlman et al. |
| 6,697,846 | B1 | * | 2/2004 | Soltis ............................ 709/217 |
| 6,880,102 | B1 | * | 4/2005 | Bridge ............................... 714/6 |
| 7,293,154 | B1 | * | 11/2007 | Karr et al. ..................... 711/202 |
| 7,386,559 | B1 | * | 6/2008 | Desai et al. ............ 707/999.101 |

(Continued)

OTHER PUBLICATIONS

Sivathanu et al., "Improving Storage System Availability with D-GRAID", 2005, ACM.*

(Continued)

*Primary Examiner* — Apu Mofiz
*Assistant Examiner* — Sheryl Holland
(74) *Attorney, Agent, or Firm* — Lowenstein Sandler LLP (57) ABSTRACT

Methods for encoding file system metadata are described herein. According to one embodiment, a file system cache is maintained including information representing relationships between inodes and disk blocks of a disk having disk sections. Each disk section includes a data segment and a header encoding metadata for describing the data section of each disk section. The metadata is encoded using a set partitioning algorithm and each set represents a set of disk blocks. In response to a file system request for reading a disk section, metadata associated with the disk section is retrieved and decoded to extract information representing a relationship between inodes and disk blocks associated with the requested disk section. The file system request is then serviced using the decoded metadata and the associated data segment and one or more entries of the file system cache are updated using the decoded metadata.

17 Claims, 9 Drawing Sheets

(56) References Cited

U.S. PATENT DOCUMENTS

| | | | |
|---|---|---|---|
| 7,631,155 B1* | 12/2009 | Bono et al. | 711/156 |
| 7,716,184 B1* | 5/2010 | Bromley | 707/640 |
| 8,924,440 B2* | 12/2014 | Faith et al. | 707/822 |
| 2003/0182322 A1* | 9/2003 | Manley et al. | 707/201 |
| 2004/0078623 A1* | 4/2004 | Totolos, Jr. | 714/4 |
| 2004/0105332 A1* | 6/2004 | Crow et al. | 365/202 |
| 2004/0133570 A1* | 7/2004 | Soltis | 707/3 |
| 2005/0246401 A1* | 11/2005 | Edwards et al. | 707/205 |
| 2007/0226331 A1* | 9/2007 | Srinivasan et al. | 709/223 |
| 2007/0260830 A1* | 11/2007 | Faibish et al. | 711/162 |
| 2007/0260842 A1* | 11/2007 | Faibish et al. | 711/170 |
| 2008/0005468 A1* | 1/2008 | Faibish et al. | 711/114 |
| 2008/0010284 A1* | 1/2008 | Beck | 707/8 |
| 2008/0172563 A1* | 7/2008 | Stokes | 713/193 |
| 2008/0270461 A1* | 10/2008 | Gordon et al. | 707/103 R |

OTHER PUBLICATIONS

"Inodes and the Function of the (node Cache File in Services for UNIX Server for NFS", Nov. 1, 2006, support.microsoft.com, Article ID: 234038.*

Rusling, D.A., "Chapter 9—The File System", 1999, David A Rusling.*

Said, Amir et al., "A New, Fast, and Efficient Image Codec Based on Set Partitioning in Hierarchical Trees," IEEE Transactions on Circuits and Systems for Video Technology, vol. 6, No. 3, Jun. 1996, 243-250.

* cited by examiner

FIG. 1

| Inode # | Extent Length | Starting Physical Block # | Starting Logical Block # |
|---|---|---|---|
| 0 | | | |
| 1 | | | |
| 2 | | | |
| ... | ... | ... | ... |
| N | | | |

SET PARTITIONING FOR ENCODING FILE SYSTEM ALLOCATION METADATA

TECHNICAL FIELD

The present invention relates generally to computer file systems. More particularly, this invention relates to set partitioning for encoding file system allocation metadata.

BACKGROUND

Bitmap based file systems such as GFS2/ext2/ext3 tend to have an on-disk structure in which the disk is divided into sections, each section of the disk having a set of metadata which is used to indicate block allocations within that section. In GFS2 such a section of disk is called a resource group. In ext2/3 such a section of disk is called a block group. Each block within the section is represented by one (or more) bits in the allocation bitmap for that particular section. The reason for partitioning the disk into sections is to help reduce fragmentation by allocating blocks for inodes from the same block group as the other blocks for that inode (assuming no other constraints come into play such as the inode being larger than a single such section of disk or a particular section of disk being full).

In GFS2 the partitioning plays an additional role in that each section of disk is given a unique lock which then allows one node in the cluster exclusive access to that part of the disk. By having a number of sections of disk which is much greater than the number of nodes in the cluster, the likelihood of two nodes wanting to allocate from the same section of disk at the same time is minimized. In GFS2 the allocation bitmap consists of two bits per block which can take the following states: 1) free block; 2) allocated block; 3) allocated inode (in use, n_link>1); and 4) unlinked, but still open inode (in use, n_link==0).

In addition, each inode in the file system has its own set of metadata which completely defines the blocks in use by that inode. In the GFS2 case that metadata takes the form of an equal height tree of block pointers. However, it takes a lot of disk space to encode a large tree. Since inodes tend to get written to disk over time, the metadata blocks often land up being scattered over the disk with the penalty of a disk seek between each block access. We also want to efficiently support file system shrink. This requires identifying all the inodes in a certain section of the file system (the last N sections of disk) where N>=1 and then moving them into free space towards the start of the disk in order to free up the last N sections of disk prior to shrinking the block device. The current metadata makes this very difficult to do because in order to identify which inodes are using any allocated blocks in the last N sections of disk, it would potentially require scanning all the metadata trees of all inodes in the file system.

Further, since there are two ways for the file system to indicate that a particular block is allocated (via the allocation bitmaps and also via a pointer in an inode's metadata tree) we have a situation where, if there is file system corruption, we might land up with conflicting information which then has to be resolved by a file system checker. Such checkers are very slow on large file systems.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, several different ideas are combined to solve a problem in the current version of the GFS2 file system (and similar allocation-bitmap based file systems (e.g., ext2/3) by proposing a new metadata layout which will allow file system shrink to be implemented more efficiently. In addition, it should allow for more efficient allocation in the file system by giving the block allocator greater information at allocation time than previous file systems have had.

The basic idea is to use a variation of a technique common in image compression known as SPIHT (Set Partitioning in Hierarchical Trees) to encode the file system allocation information. SPIHT has been used for image compression, but it has not been used in a file system.

Figure 1:
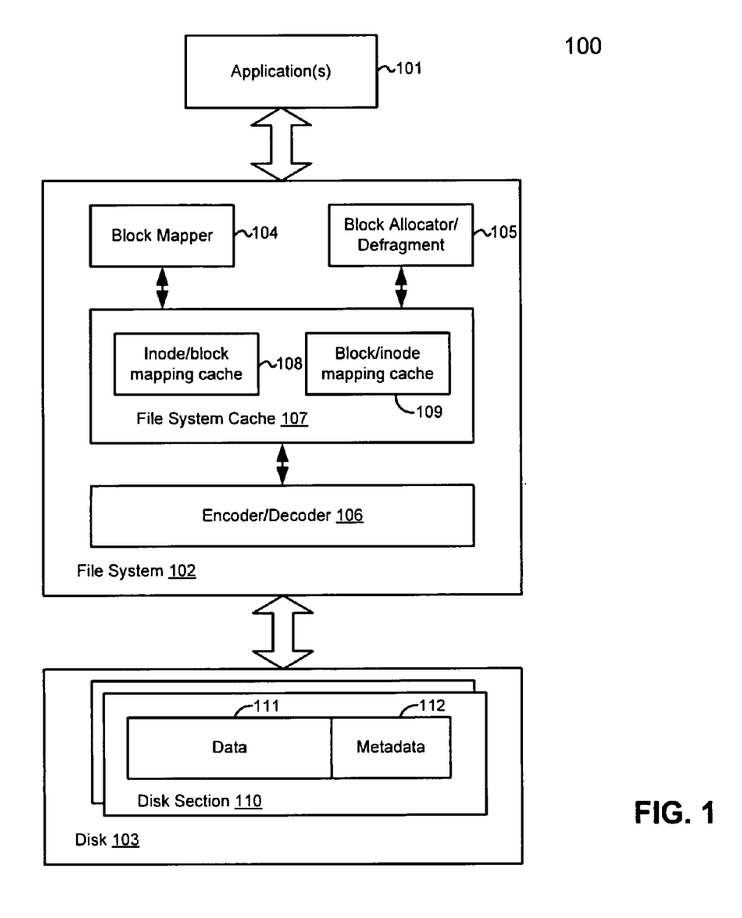
FIG. 1 is a block diagram illustrating an example of a file system according to one embodiment of the invention.

FIG. 1 is a block diagram illustrating an example of a file system according to one embodiment of the invention. System 100 may be implemented as a variety of computing systems or devices. Referring to FIG. 1, system 100 includes one or more applications 101 accessing files stored in disk 103 via file system 102.

Disk 103 includes multiple disk sections 110 having a data segment 111 and a metadata segment 112. According to one embodiment, metadata 112 has a variable size and encoded according to an algorithm similar to SPIHT, also referred to herein as simply a set partitioning algorithm throughout this application. The payout or format of the metadata 112 will be described in details further below.

File system 102 includes a typical block mapper 104 and block allocator and/or defragmentation unit 105 as can be found in an ordinary file system. In one embodiment, file system 102 further includes an encoder and/or decoder 106 for encoding and decoding metadata 112 in response to requests received block mapper 104 and block allocator 105. The encoder/decoder 106 may be implemented as separate coders or alternatively, they may be implemented as a single coder having both functionalities, dependent upon a specific configuration of system 100.

In addition, file system 102 maintains a file system cache 107 to cache certain frequent activities of the file system. In one embodiment, file system cache 107 includes an inode/block mapping cache 108 and a block/inode mapping cache 109. Caches 108-109 may be implemented as separate caches or databases or alternatively, they may be implemented as a single cache or database, dependent upon a specific configuration of system 100. Note that file system 102 may be implemented in a variety of operating systems, such as, for example, Linux, Windows, and/or MacOS, etc.

According to one embodiment, each section of disk includes a variable sized (but with a maximum bound that is sufficiently small that it could still be contained within a few contiguous disk blocks, as per the existing bitmap based system) bitstream encoding a set partitioned allocation map. Unlike SPIHT, the sets in question would be sets of disk blocks. The main differences from the previous bitmap based approach is that the metadata is now variable sized and that it now encodes not only the state (allocated, not allocated, inode, unlinked inode) but also the extent of blocks allocated to that inode, according to one embodiment. It does not, however, encode the ordering of the blocks allocated to a particular inode.

According to another embodiment, each inode would now have a variable sized (but again, with a sensible allocation algorithm bounded at a small size) bitstream which encodes the ordering of blocks allocated to that inode. It is useful to note that if you were designing a file system which would be read-only and could be allocated optimally. This requirement may be omitted as the inode's blocks could be used in their natural disk block order. In addition, the bitstream generated above could be such that it encoded the blocks of the inodes using the minimal possible disk space.

According to certain embodiments of the invention, an inode may be defined to be: (a) the first disk block in each inode's extent of data blocks (e.g., one inode per block similar to GFS2 filesystem), in which case the directory entry pointing to the inode also indicates which is the first disk block in this situation, or alternatively, (b) a collection of metadata contained entirely within the directory entry.

In both cases set forth above, there may be an issue relating to hard links (e.g., multiple directory entries pointing to the same inode) in that one needs to have a "master" directory entry which contains the information which we only want to specify once (e.g., the location of the inode in the situation (a) above or all the inode metadata in the situation (b) above. One thus has to deal with the situation that the "master" directory entry has been unlinked, but other directory entries remain. One way to do that is to elect a new master directory entry from among the remaining links and to move the information to that new directory entry. Another possible solution in the case of (a) only, is to put the information about the location of the inode into all the directory entries. This makes defragmentation and filesystem shrink potentially much slower since a full directory tree scan might be required, but is a far simpler solution overall than moving the directory entry information about.

Also, for the purposes of illustration, the term "inode" is used to describe both the collection of metadata associated with a particular file (such as permissions, file type, file size, extended attributes, etc) as an abstract term as well as to mean the "on disk" representation of that information. The meaning being clear from the context as per common practice.

The encodings used here are essentially data compression techniques. The reason for using them is that with smaller metadata, fewer blocks are required to encode it and by putting more of the metadata information into the "section of disk" all the metadata for a number of inodes can be read at the same time, thus eliminating disk seeks and also allowing certain optimizations. For example, read-ahead of multiple inodes can be performed at once (e.g. after getdents64 it would be possible to read ahead all the inodes in one section of disk relating to that directory in optimal order). In addition, shrink becomes easier as there is now a quick inode-to-blocks mapping in each section of disk. Further, online defragmentation becomes much easier and more efficient and it can also be done on one section of disk at a time, so that it can be done in the background on a working filesystem.

Further, since the allocated now has additional information, it would be possible to consider moving small files to different disk locations at allocation time if they are preventing contiguous allocation of larger files. This is made possible by the knowledge of the mapping from disk block to inode. The metadata related to block allocation associated with each inode would in most cases be exactly 1 bit in size, if the blocks allocated to it were used in their natural order (i.e. lowest to highest). Note that the procedure involved herein is similar to the one used to encode the metadata of a section of disk. There is a certain relationship to FAT (file allocation table) type file systems and it would be possible to consider this scheme as a variation on a compressed version of FAT.

In one embodiment, free blocks could be represented by allocating them to a "special" inode (e.g., the first overall inode or inode zero) which would contain all the free blocks for the particular section of disk. This embodiment is compatible with the phase-tree/netapp/ZFS type update schemes since now only one place has to be updated upon block allocation (the metadata of the section of disk) rather than two (e.g., the inode as well). Given control over which inode numbers are used in which section of disk, it would be possible to create a much more efficient encoding than would otherwise be possible. Note that, in order to be compatible with the phase tree type system, enough disk space is required for a number of independent copies (minimum of two) of the metadata plus a system to decide which one is the "live" copy at any given time.

Figure 2:
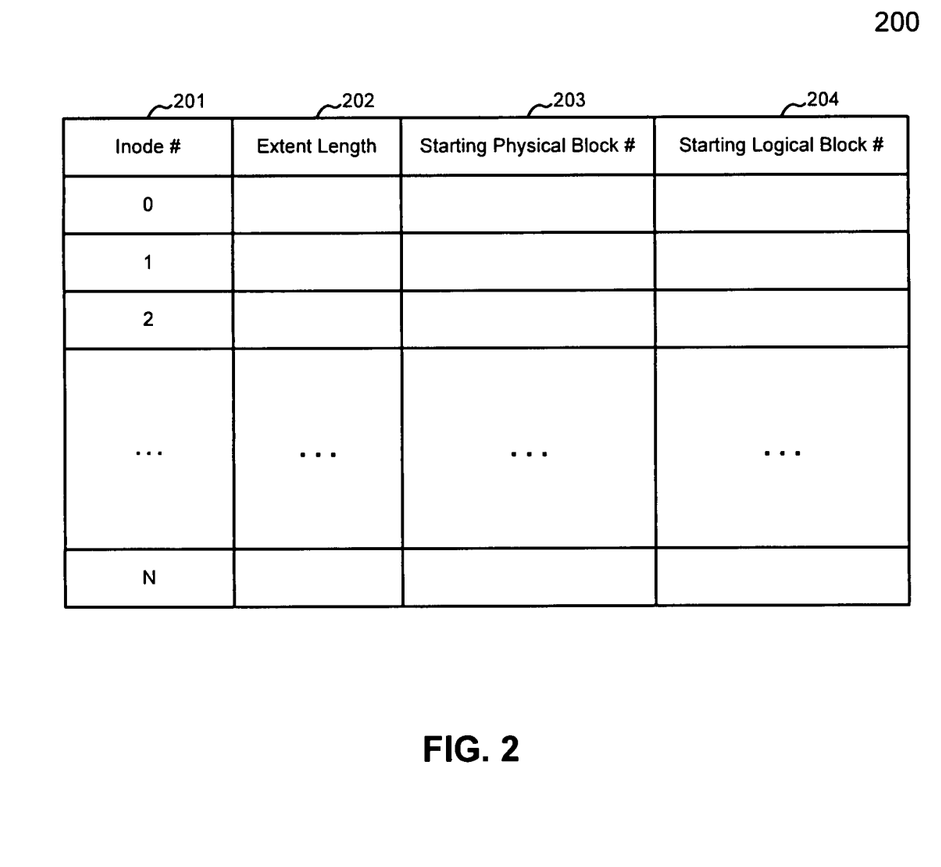
FIG. 2 is a block diagram illustrating a data structure representing metadata of cached in memory according to one embodiment of the invention.

FIG. 2 is a block diagram illustrating a data structure representing metadata of cached in memory according to one embodiment of the invention. Referring to FIG. 2, data structure 200 includes a variety of fields, including at least inode number 201 (i.e. a filesystem wide unique ID), extent length 202, starting physical (i.e. on the storage medium) block number 203, and starting logical (i.e. relating to this inode) block number 204. Note that the block/inode mapping cache and inode/block mapping cache may be constructed based on metadata information obtained from the data structure 200, for example, by indexing according to different data members (e.g., based on physical start block number 203 or a combination of inode number 201 and logical block starting number 204). Metadata associated with a particular disk section may be extracted from data structure 200 and encoded in the associated disk section according to a predetermined compression algorithm, such as a set partitioning algorithm, where each set represents a set of disk blocks. Thus, whenever a particular disk section is updated (e.g., change of allocation data, mount or unmount of a file system, etc.), the caches may be updated or synchronized with the metadata of affected disk sections accordingly. This may also be performed according to a predetermined schedule.

In one embodiment, an inode is designated as a special inode to store all unallocated blocks. For the purposes of illustration, it is assumed that inode number zero is used as a special inode to contain all the blocks which are not otherwise accounted for by the other entries in the database. It is also assumed that certain rules are applied here: 1) each physical block is mapped to exactly one logical block at all times; and 2) logical (and by the above also Physical) blocks always belong to exactly one inode.

In one embodiment, the database (cache) is indexed by two indices: a) by physical block number; and b) by the combination logical block/inode number. In both cases looking up a particular block number will find the extent in which that block resides, so that the index will most likely be implemented as a tree with the key being the ending block number of each extent. There are other possible index implementations which have various advantages and disadvantages in terms of lookup, insertion and deletion times.

As mentioned above, the database (cache) might be implemented as a set of data structures in the memory of a computer. It might be implemented as a set of caches (one per section of disk) or it might be implemented as a single cache with the addition of a distinguishing field to indicate which section of disk it related to, to the above record structure.

Figure 3:
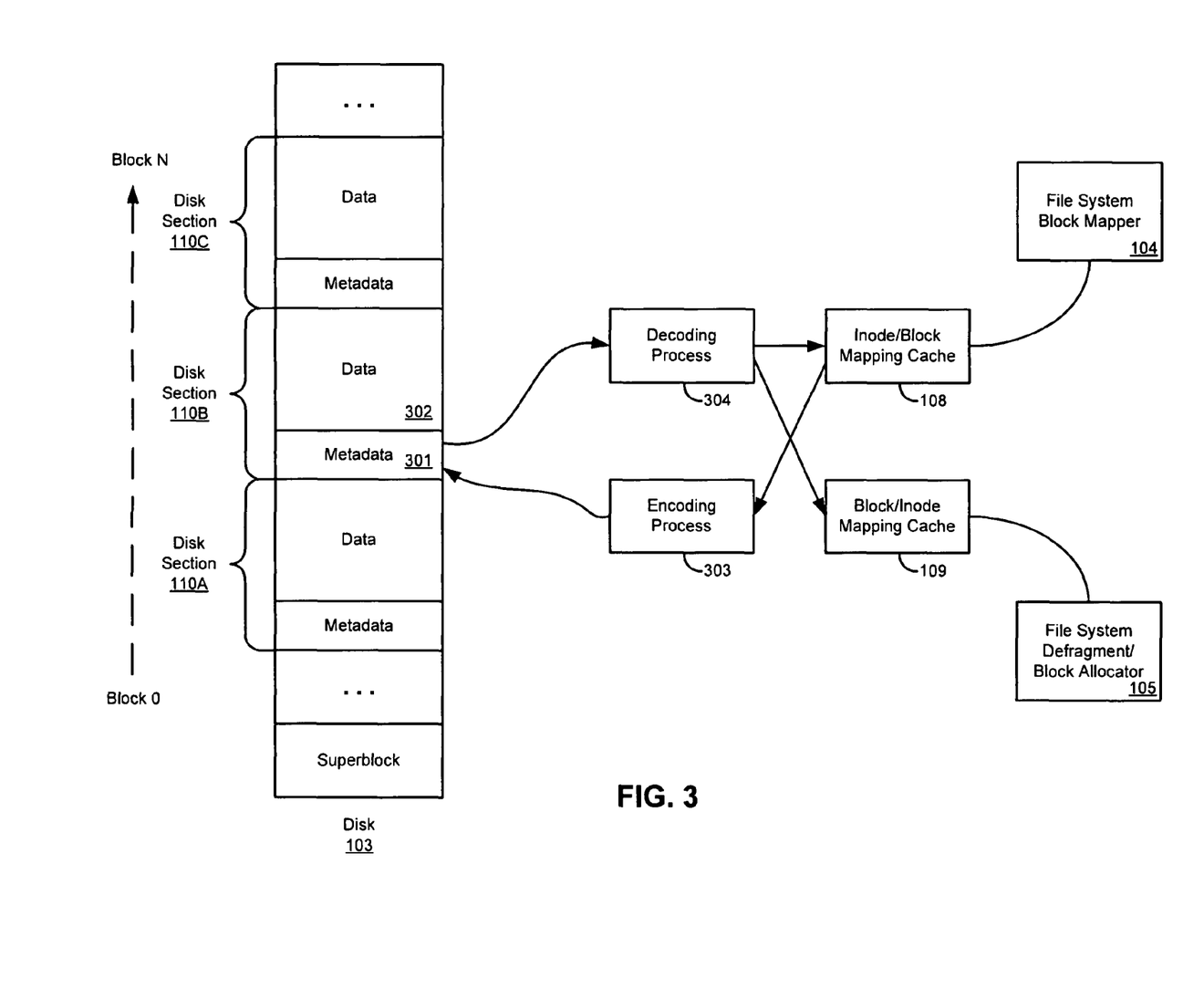
FIG. 3 is a diagram illustrating interaction of a file system according to one embodiment of the invention.

FIG. 3 is a diagram illustrating interaction of a file system according to one embodiment of the invention. Referring to FIG. 3, disk 103 is partitioned or arranged into multiple disk sections 110A-110C. Each disk section includes a header and a data segment. For example, disk section 110B includes a header 301 and data segment 302. Header 301 is used to store metadata which is encoded by encoding process 303 performed by an encoder when a write operation is performed. The metadata 301 is read and decoded by a decoding process performed by a decoder when a read operation is performed.

In this example, the encoding process 303 reads the cache 108 relating to one section of disk and produces a bitstream suitable for writing out into the fixed size header 301 of that particular section 110B of disk. The decoding process 304 reads data from the fixed size header 301 of the section 110B of disk and creates entries in the cache 108-109. The decoding process may be total or progressive. In the latter case only part of the data will be decoded (presumably just enough to answer a block mapping query from higher layers) and the remainder will be left, potentially for later decoding.

Figure 4:
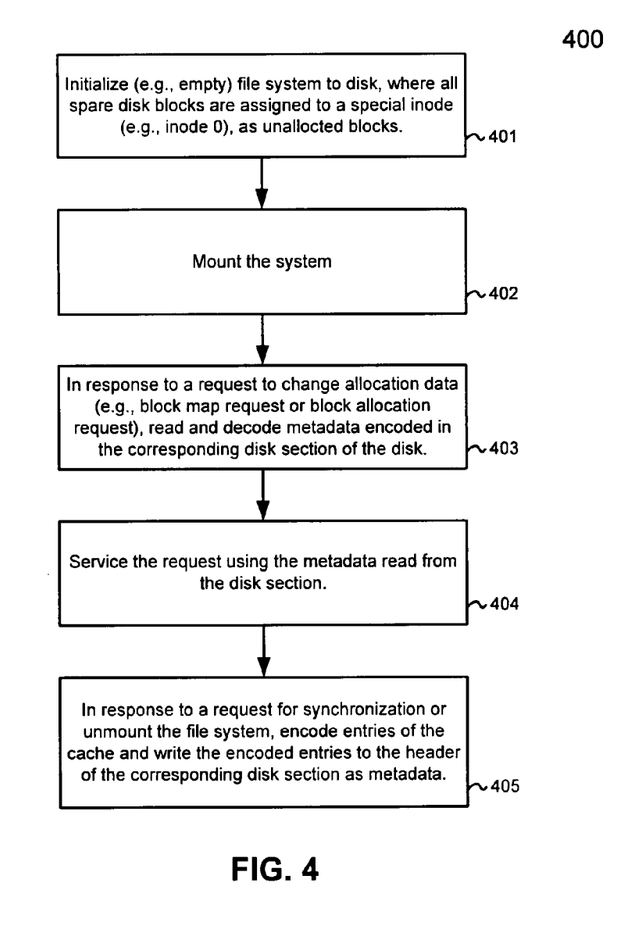
FIG. 4 is a flow diagram illustrating a process for initializing a file system according to one embodiment.

If there is a need to change the allocation data, the entire data for that section of disk must be decoded, the data structures updated and then the encoding process writes out the new data to disk. FIG. 4 is a flow diagram illustrating a process for initializing a file system according to one embodiment. Note that process 400 may be performed by processing logic which may include software, hardware, or a combination of both. For example, process 400 may be performed by system 100 of FIG. 1.

Referring to FIG. 4, at block 401, processing logic initializes (e.g., using mkfs or similar tool) a file system to a disk. All spare disk blocks are assigned to inode 0 (i.e. unallocated). Processing logic then mounts the file system at block 402. In response to a request to change allocation data (e.g., block map request or block allocation request), at block 403, processing logic reads and decodes metadata from the corresponding disk section of the disk and then services the request at block 404. For example, any read-only activity on the file system causes the headers from sections of disk to be read in, in full or progressively, to satisfy block map requests. Similarly, any write activity on the file system causes any headers of sections of disk required for allocation to be read in, in full. At block 405, in response to a request for synchronization or unmount the file system, processing logic encodes entries in the cache and writes the encoded entries to the header or headers of the corresponding disk section or sections as metadata. For example, sync requests result in any modified headers of sections of disk to be written out (after the encoding process) and unmounting requires a sync operation. Thus, one would expect to be able to satisfy a number of allocation requests from one single section of disk and to only require a single update to the allocation map stored on disk. Note that encoding and decoding processes may be performed using an algorithm similar to the set partitioning algorithm mentioned above.

Figure 5:
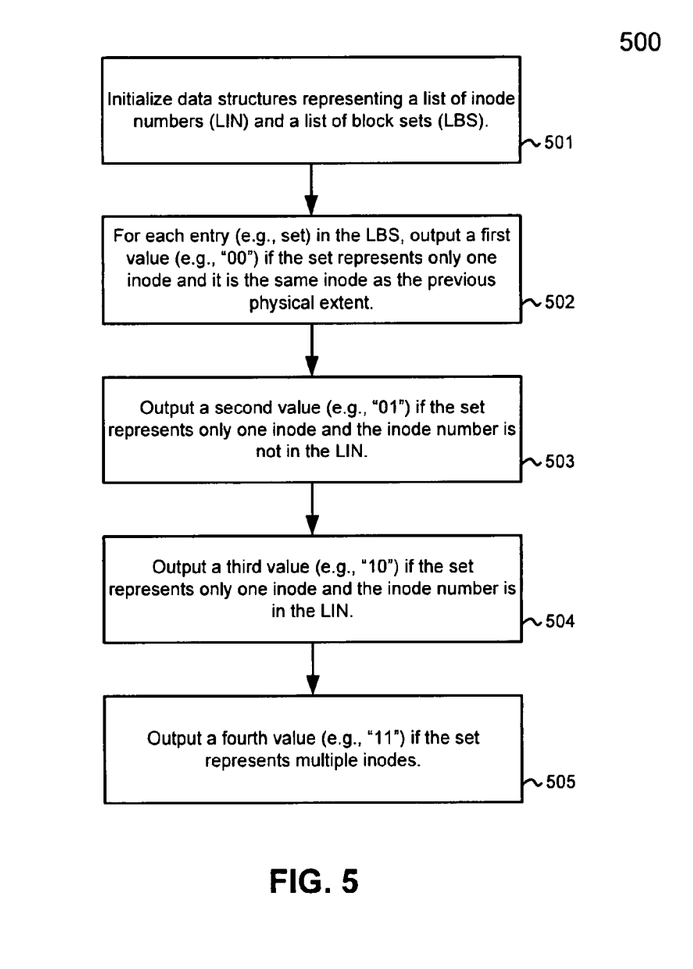
FIG. 5 is a flow diagram illustrating a process for encoding metadata according to one embodiment of the invention.

FIG. 5 is a flow diagram illustrating a process for encoding metadata according to one embodiment of the invention. Note that process 500 may be performed by processing logic which may include software, hardware, or a combination of both. For example, process 500 may be performed by encoder/decoder 106 of FIG. 1. Note that the corresponding decoding process is just the reverse of process 500. Referring to FIG. 5, at block 501, data structures are initialized to represent a list of inode numbers (LIN) and a list of block sets (LBS). In one embodiment, the LIN is initialized with a single entry for inode zero while the LBS is initialized with a single entry which represents every block in the section of disk.

At block 502, for each entry (e.g., set) in the LBS, a first predetermined code or value (e.g., code "00") is generated and output if the set represents only one inode and it is the same inode as the previous physical extent. In addition, processing logic codes a single bit to indicate whether this inode has any more uncoded extents in the current section of disk. If it does not, processing logic removes the inode's entry from the LIN.

At block 503, if the set represents only one inode and the inode number is not in the LIN, the processing logic generates a second predetermined code (e.g., "01"). The processing logic then outputs the inode number and adds the inode number to the LIN. Processing logic further codes a single bit to indicate whether the inode has any more uncoded extents in the current section of disk. If it does not, processing logic removes the inode's entry from the LIN.

At block 504, if the set represents only one inode and the inode number is in the LIN, a third predetermined code (e.g., "10") is generated and output. In addition, processing logic outputs the index of the inode number in the LIN and then codes a single bit to indicate whether the inode has any more uncoded extents in the current section of disk. If it does not, the inode's entry is removed from the LIN.

At block 505, if the set represents more than one inode, a fourth predetermined code (e.g., "11") is generated and output. In this case processing logic splits the set into two halves and adds those halves to the end of the LBS so that they will be scanned again subsequently.

Note that for the case of the first extent in the section of disk, inode 0 will always be considered the "previous inode number". It is assumed that the index of the inode number within the LIN will be encoded with fewer bits than a complete inode number. In a simple implementation, both the inode numbers and the index into the LIN would be fixed length. In a more efficient implementation, variable length encoding schemes might be used. The only requirement that we place on such as variable length scheme is that it results in prefix-free codes. Note that although the algorithm will function correctly with inode numbers which are the same length (in binary digits) as the LIN index numbers, the reason for using the LIN is to allow for a more succinct way to refer to the inodes, so that the overall number of bits required to encode the data is reduced. Since the size of the LIN is known by both encoder and decode at all times, it is possible to use a binary word of size ceil(log_{2}(N)) in size where N is the number of entries in the LIN.

The question of whether a particular set represents one or more inodes is determined by looking up records in the database (cache). The whole algorithm depends on maintaining the ordering of the LBS and LIN, so that it is critical that the encoding and decoding process both scan the lists in the same order.

There are certain special situations that are worth to paying attention to. One situation is related to an empty (unallocated) section of disk. This is represented by the two-bit code 00 (i.e. the whole extent belongs to the same inode as the previous physical extent, which is always assumed to be inode 0 for the initial extent). Another situation is related to full (allocated to a single inode) section of disk. This is represented as 01 <inode-number> 0 (i.e. the whole extent belongs to the same inode whose number is <inode-number> and it is the last extent in this set of blocks which belongs to this inode). Note that the encoding scheme described throughout this application may be used in conjunction with other entropy encoding schemes, such as, for example, alrithmetic or Huffman coding schemes, etc.

Figure 6:
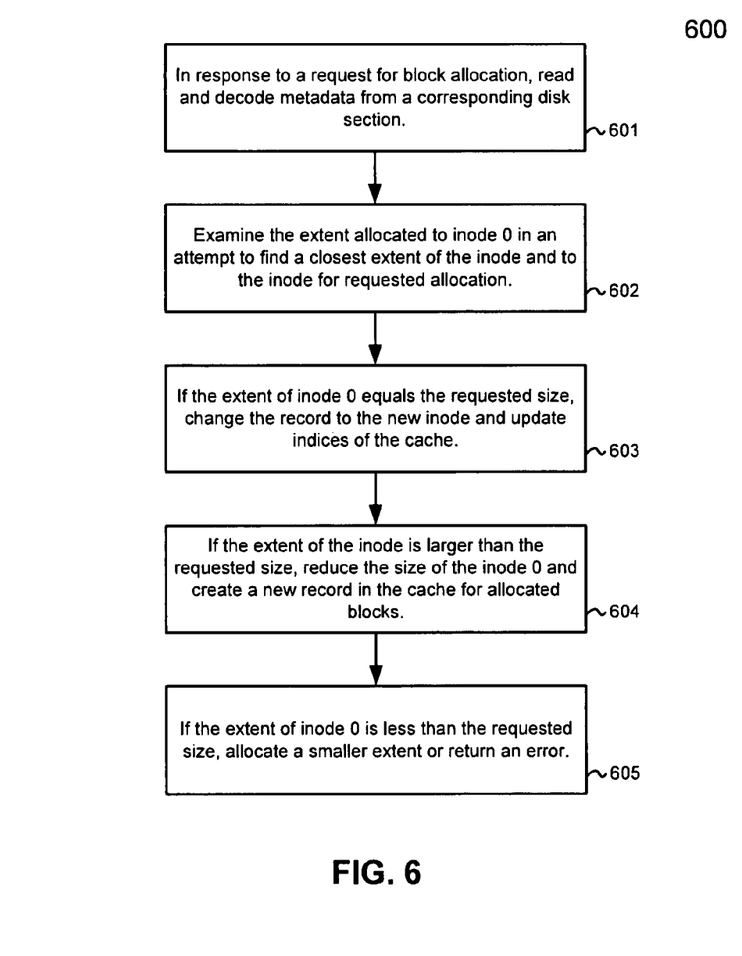
FIG. 6 is a flow diagram illustrating a block allocation process according to one embodiment of the invention.

FIG. 6 is a flow diagram illustrating a block allocation process according to one embodiment of the invention. Note that process 600 may be performed by processing logic which may include software, hardware, or a combination of both. For example, process 600 may be performed by system 100 of FIG. 1. Referring to FIG. 6, in response to a request for block allocation, at block 601, metadata is read from a selective disk section and decoded by a decoder. At block 602, processing logic examines the extents allocated to inode 0. In the case of allocating blocks for an existing inode, processing logic tries to find the closest extent of inode 0 to the existing blocks belonging to the inode for which the allocation is requested.

If the extent of inode 0 is the same size as the requested allocation, at block 603, processing logic then changes the record to belong to the new inode (and update the two indices as required) and returns success. If the extent of inode 0 is greater than the requested allocation, at block 604, processing logic then reduces it in size, which creates a new record in the database (cache) for the allocated blocks (unless its possible to extend an existing record for the inode in question). So this is basically a transfer of blocks from one inode (0) to another. If the extent of inode 0 is less than the requested size, at block 605, processing logic either allocates a smaller extent or returns an error (e.g., "fill system full", implementation dependent). Note that an "allocate on flush" operation would allow the block allocations to be much more optimal compared with allocating at each write call.

Figure 7:
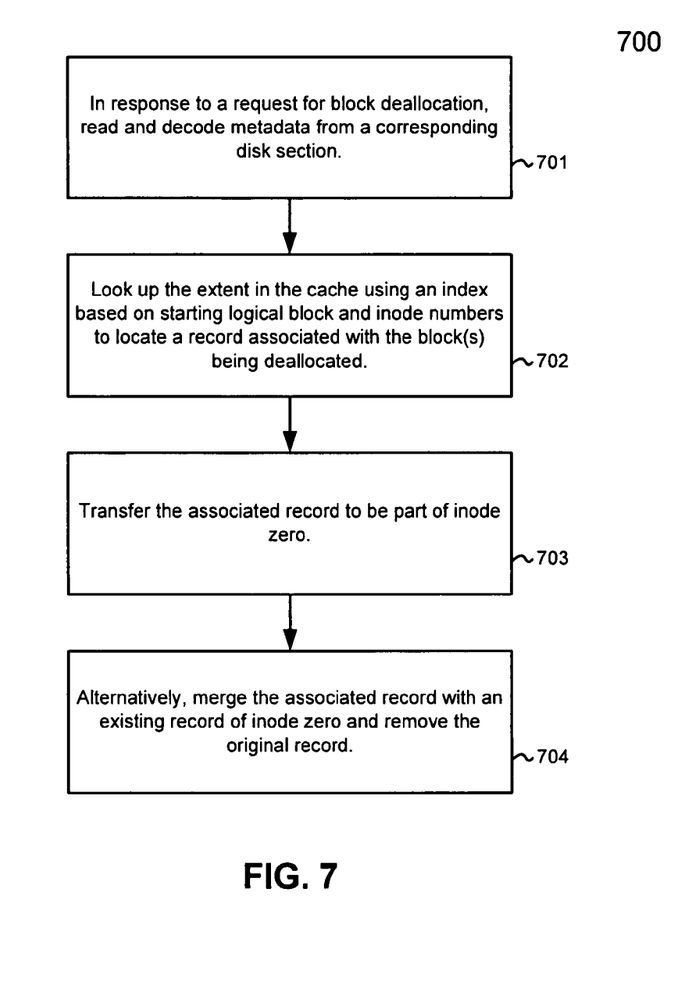
FIG. 7 is a flow diagram illustrating a block deallocation process according to one embodiment of the invention.

FIG. 7 is a flow diagram illustrating a block deallocation process according to one embodiment of the invention. Note that process 700 may be performed by processing logic which may include software, hardware, or a combination of both. For example, process 700 may be performed by system 100 of FIG. 1. Referring to FIG. 7, in response to a request for block deallocation, at block 701, processing logic reads in and decodes the section of disk associated with the blocks which are to be deallocated in full. At block 702, processing logic looks up the extent in the database (cache) using the logical block/inode index and then either: a) transfers that record to belong to inode 0 at block 703, or b) merges that record with an existing record of inode 0 and removes the original entry at block 704.

Figure 8:
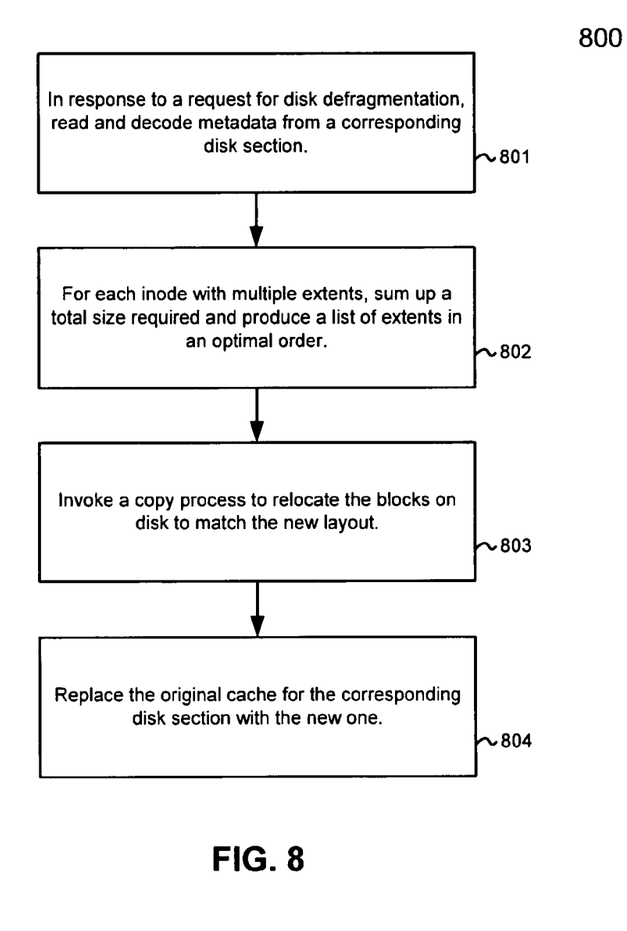
FIG. 8 is a flow diagram illustrating a block defragmentation process according to one embodiment of the invention.

FIG. 8 is a flow diagram illustrating a block defragmentation process according to one embodiment of the invention. Note that process 800 may be performed by processing logic which may include software, hardware, or a combination of both. For example, process 800 may be performed by system 100 of FIG. 1. Referring to FIG. 8, in response to a request for disk defragmentation, at block 801, processing logic reads in and decodes the header of the section of disk to be defragmented in full. For each inode with greater than one extent, at block 802, processing logic a) sums total size required; b) considers other ordering requirements (such as directory order for example); c) produces a list of extents in optimal order (e.g., the new database or cache). At block 803, processing logic invokes a copying process to relocate the blocks on disk to match the new layout. At block 804, processing logic replaces the original database (cache) for the section of disk with the one calculated above.

Note that other defragmentation algorithms are possible which work progressively relocating blocks as they go. The one important requirement is that blocks are not reordered "within one inode" so that if there are two extents belonging to an inode (lets call them A and B) such that A starts at a lower block number than B, then after defragmentation, the combined extent for the inode will have A's blocks before B's blocks. Other configurations may also exist.

Figure 9:
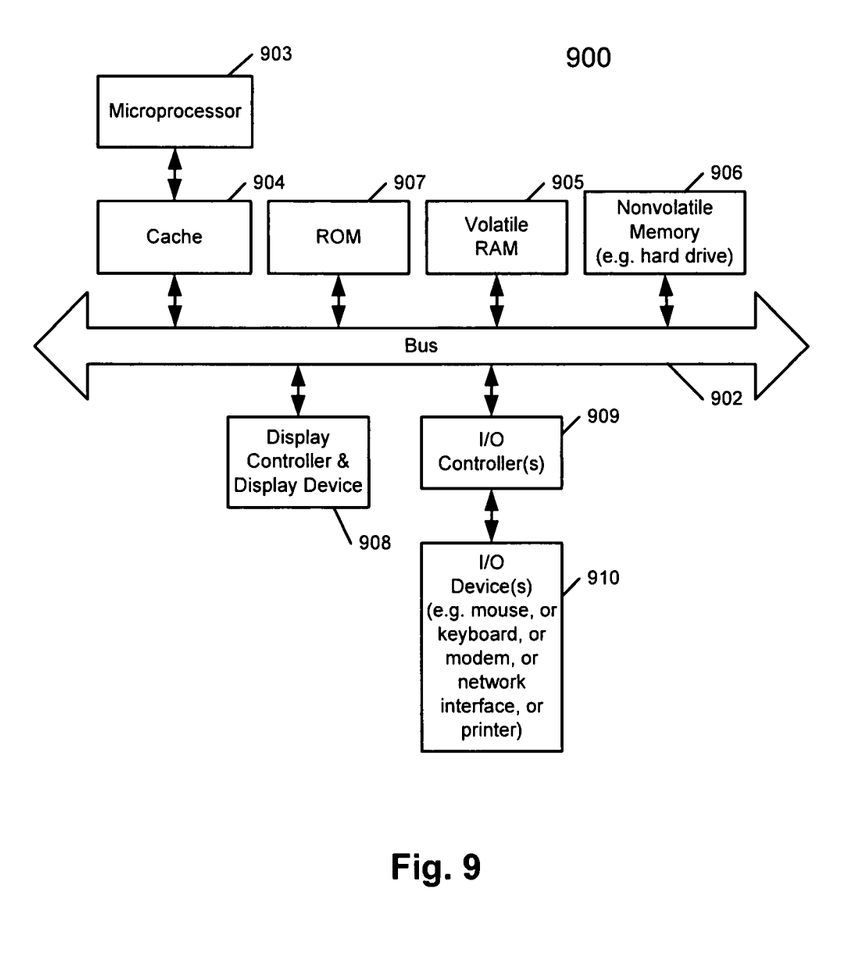
FIG. 9 illustrates a diagrammatic representation of a machine in the exemplary form of a computer system.

FIG. 9 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

For example, the system 900 may be used as part of system 100 as shown in FIG. 1. As shown in FIG. 9, the system 900, which is a form of a data processing system, includes a bus or interconnect 902 which is coupled to one or more microprocessors 903 and a ROM 907, a volatile RAM 905, and a non-volatile memory 906. The microprocessor 903 is coupled to cache memory 904 as shown in the example of FIG. 9. Processor 903 may be, for example, a PowerPC microprocessor or an Intel compatible processor. Alternatively, processor 903 may be a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used.

The bus 902 interconnects these various components together and also interconnects these components 903, 907, 905, and 906 to a display controller and display device 908, as well as to input/output (I/O) devices 910, which may be mice, keyboards, modems, network interfaces, printers, and other devices which are well-known in the art.

Typically, the input/output devices 910 are coupled to the system through input/output controllers 909. The volatile RAM 905 is typically implemented as dynamic RAM (DRAM) which requires power continuously in order to refresh or maintain the data in the memory. The non-volatile memory 906 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 9 shows that the non-volatile memory is a local device coupled directly to the rest of the components in the data processing system, embodiments of the present invention may utilize a non-volatile memory which is remote from the system; such as, a network storage device which is coupled to the data processing system through a network interface such as a modem or Ethernet interface. The bus 902 may include one or more buses connected to each other through various bridges, controllers, and/or adapters, as is well-known in the art. In one embodiment, the I/O controller 909 includes a USB (Universal Serial Bus) adapter for controlling USB peripherals. Alternatively, I/O controller 909 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method, comprising:
   maintaining, by a processor, a file system stored on a disk, wherein the disk comprises a disk section, and wherein the disk section comprises a data segment and a variable-sized metadata segment, and wherein the variable-sized metadata segment comprises:
   (1) an encoding of an allocation map of a plurality of disk blocks of the disk section, wherein the encoding of the allocation map is generated via hierarchical set-partitioning compression,
   (2) a state of a first inode of the file system, and
   (3) an extent of disk blocks allocated to the first inode;
   maintaining a file system cache associated with the file system, wherein the file system cache comprises a cache entry corresponding to the first inode, and wherein the cache entry specifies:
   a starting physical block number of the extent of disk blocks allocated to the first inode,
   a starting logical block number relative to the first inode, and
   a length of the extent;
   maintaining an index of the file system cache, the index comprising an index entry that maps at least one of an ending physical block number of the extent or an ending logical block number of the extent to the first inode;

receiving a first file system request with respect to the disk section;

in response to the first file system request, retrieving and decoding, by the processor, the variable-sized metadata segment;

servicing the first file system request using the decoded variable-sized metadata segment;

updating the cache entry using the decoded variable-sized metadata segment and the index of the file system cache;

receiving a second file system request; and servicing the second file system request in view of the updated file system cache.

2. The method of claim 1, wherein the first file system request is a request for block allocation, and wherein the method further comprises:

examining an extent allocated to inode zero in an attempt to locate a closest extent of an inode in view of an extent requested in the block allocation;

modifying a record of inode zero to a new inode and updating indices of the file system cache when the extent of inode zero equals to the requested extent;

reducing the extent of inode zero and creating a new record in the file system cache for blocks allocated for the request when the extent of inode zero is larger than the requested extent.

3. The method of claim 1, wherein the file system request is a request for block deallocation, and wherein the method further comprises:

looking up extents in the file system cache using the index of the file system cache to locate a record associated with a block being deallocated; and transferring or merging the located record with a record associated with inode zero.

4. The method of claim 1, wherein the file system request is a request for disk defragmentation, and wherein the method further comprises:

for each inode having multiple extents, summing a total size required for the multiple extents and generating a list of extents in a predetermined order;

invoking a copy process to relocate blocks on disk to generate a new layout of the disk having fewer fragmentation; and synchronizing the file system cache with metadata stored in disk sections of the disk in the new layout, including encoding metadata from the file system cache and storing the encoded metadata in headers of the disk sections.

5. The method of claim 1, wherein the generating of the encoding of the allocation map comprises:

initializing a data structure representing a list of inode numbers (LIN) and a data structure representing a list of block sets (LBS);

for each entry of the LBS, generating and outputting a first code when a respective set represents only one inode and the represented inode is the same inode as a previous extent;

generating and outputting a second code when the respective set represents only one inode and the represented set is not included in the LIN;

generating and outputting a third code when the respective set represents only one inode and the represented set is included in the LIN; and generating and outputting a fourth code when the respective set represents a plurality of inodes.

6. The method of claim 5, wherein the generating of the encoding of the allocation map comprises:

encoding a bit to indicate whether the represented inode includes any uncoded extents in a current disk section; and removing a file system cache entry associated with the represented inode from the LIN if when the represented inode does not include any uncoded extents in the current disk section.

7. A non-transitory machine-readable medium having instructions stored therein, the instructions to cause a processor to:

maintain, by the processor, a file system stored on a disk, wherein the disk comprises a disk section, and wherein the disk section comprises a data segment and a variable-sized metadata segment, and wherein the variable-sized metadata segment comprises:

(1) an encoding of an allocation map of a plurality of disk blocks of the disk section, wherein the encoding of the allocation map is generated via hierarchical set-partitioning compression, (2) a state of a first inode of the file system, and (3) an extent of disk blocks allocated to the first inode;

maintain, by the processor, a file system cache associated with the file system, wherein the file system cache comprises a cache entry corresponding to the first inode, and wherein the cache entry specifies:

a starting physical block number of the extent of disk blocks allocated to the first inode, a starting logical block number relative to the first inode, and a length of the extent;

maintain, by the processor, an index of the file system cache, the index comprising an index entry that maps at least one of an ending physical block number of the extent or an ending logical block number of the extent to the first inode;

receive a first file system request with respect to the disk section;

in response to the first file system request, retrieve and decode the variable-sized metadata segment;

service the first file system request using the decoded variable-sized metadata segment;

update, by the processor, the cache entry using the decoded variable-sized metadata segment and the index of the file system cache;

receive a second file system request; and service the second file system request in view of the updated file system cache.

8. The non-transitory machine-readable medium of claim 7, further comprising executable instructions causing the processor to:

examine an extent allocated to inode zero in an attempt to locate a closest extent of an inode in view of an extent requested in the block allocation;

modify, by the processor, a record of inode zero to a new inode and updating indices of the file system cache when the extent of inode zero equals to the requested extent; and reduce the extent of inode zero and creating a new record in the file system cache for blocks allocated for the request when the extent of inode zero is larger than the requested extent.

9. The non-transitory machine-readable medium of claim 7, further comprising executable instructions causing the processor to:
- look up, by the processor, extents in the file system cache using the index of the file system cache to locate a record associated with a block being deallocated; and
- transfer or merge the located record with a record associated with inode zero.

10. The non-transitory machine-readable medium of claim 7, further comprising executable instructions causing the processor to:
- for each inode having multiple extents, sum, by the processor, a total size required for the multiple extents and generate, by the processor, a list of extents in a predetermined order;
- invoke, by the processor, a copy process to relocate blocks on disk to generate a new layout of the disk having fewer fragmentation; and
- synchronize the file system cache with metadata stored in disk sections of the disk in the new layout, including encoding metadata from the file system cache and storing the encoded metadata in headers of the disk sections.

11. The non-transitory machine-readable medium of claim 7, wherein the executable instructions further cause the processor to generate the encoding, and wherein to generate the encoding, the processor is to:
- initialize, by the processor, a data structure representing a list of inode numbers (LIN) and a data structure representing a list of block sets (LBS);
- for each entry of the LBS, generate and output a first code when a respective set represents only one inode and the represented inode is the same inode as a previous extent;
- generate and output a second code when the respective set represents only one inode and the represented set is not included in the LIN;
- generate and output a third code when the respective set represents only one inode and the represented set is included in the LIN; and
- generate and output a fourth code when the respective set represents a plurality of inodes.

12. The non-transitory machine-readable medium of claim 11, wherein the executable instructions further cause the processor to generate the encoding, and wherein to generate the encoding, the processor is to:
- encode, by the processor, a single bit to indicate whether the first inode includes any uncoded extents in a current disk section; and
- remove a file system cache entry associated with the first inode from the LIN if the first inode does not include any uncoded extents in the current disk section.

13. A system comprising:
- a memory to store a file system cache associated with a file system stored on a disk, wherein the disk comprises a disk section, and wherein the disk section comprises a data segment and a variable-sized metadata segment, and wherein the variable-sized metadata segment comprises:
  - (1) an encoding of an allocation map of a plurality of disk blocks of the disk section, wherein the encoding of the allocation map is generated via hierarchical set-partitioning compression,
  - (2) a state of a first inode of the file system, and
  - (3) an extent of disk blocks allocated to the first inode; and
- a processor, operatively coupled to the memory, to:
  - identify a cache entry of the file system cache corresponding to the first inode, and wherein the cache entry specifies:
    - a starting physical block number of the extent of disk blocks allocated to the first inode,
    - a starting logical block number relative to the first inode, and
    - a length of the extent;
  - maintain an index of the file system cache, the index comprising an index entry that maps at least one of an ending physical block number of the extent or an ending logical block number of the extent to the first;
  - receive a first file system request with respect to the disk section;
  - in response to the first file system request, retrieve and decode, by the processor, the variable-sized metadata segment;
  - service the file system request using the decoded variable-sized metadata segment;
  - update the cache entry using the decoded variable-sized metadata segment and the index of the file system cache;
  - receive a second file system request; and
  - service the second file system request in view of the updated file system cache.

14. The system of claim 13, wherein the processor is further to:
- initialize a data structure representing a list of inode numbers (LIN) and a data structure representing a list of block sets (LBS);
- for each entry of the LBS, generate and output a first code when a respective set represents only one inode and the represented inode is the same inode as a previous extent;
- generate and output a second code when the respective set represents only one inode and the represented set is not included in the LIN;
- generate and output a third code when the respective set represents only one inode and the represented set is included in the LIN; and
- generate and output a fourth code when the respective set represents a plurality of inodes.

15. The system of claim 13, wherein the processor is further to generate the encoding, and wherein to generate the encoding, the processor is to:
- encode a bit to indicate whether the represented inode includes any uncoded extents in a current disk section; and
- remove a file system cache entry associated with the first inode from the LIN when the first inode does not include any uncoded extents in the current disk section.

16. The system of claim 13, wherein the processor is further to:
- examine an extent allocated to inode zero in an attempt to locate a closest extent of an inode in view of an extent requested in the block allocation;
- modify a record of inode zero to a new inode and updating indices of the file system cache when the extent of inode zero equals to the requested extent; and
- reduce the extent of inode zero and creating a new record in the file system cache for blocks allocated for the request when the extent of inode zero is larger than the requested extent.

17. The system of claim 13, wherein the processor is further to:

look up extents in the file system cache using the index of the file system cache to locate a record associated with a block being deallocated; and transfer or merge the located record with a record associated with inode zero.

* * * * *

UNITED STATES PATENT AND TRADEMARK OFFICE
CERTIFICATE OF CORRECTION

| | |
|---|---|
| PATENT NO. | : 9,678,879 B2 |
| APPLICATION NO. | : 12/129505 |
| DATED | : June 13, 2017 |
| INVENTOR(S) | : Steven Whitehouse |

It is certified that error appears in the above-identified patent and that said Letters Patent is hereby corrected as shown below:

In the Claims

In Claim 6, Column 12, Line 9, delete "if"

Signed and Sealed this
Thirty-first Day of July, 2018

Andrei Iancu
*Director of the United States Patent and Trademark Office*